United States Patent
Hegde et al.

(10) Patent No.: US 8,483,095 B2
(45) Date of Patent: Jul. 9, 2013

(54) CONFIGURABLE NETWORK SOCKET RETRANSMISSION TIMEOUT PARAMETERS

(75) Inventors: Nikhil Hegde, Round Rock, TX (US); Sophia Jacob, Bangalore (IN); Vishal R Mansur, Hubli (IN); Arnab Tah, Chandannagar (IN)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 12/944,490

(22) Filed: Nov. 11, 2010

(65) Prior Publication Data

US 2012/0120848 A1    May 17, 2012

(51) Int. Cl.
*H04L 12/28* (2006.01)

(52) U.S. Cl.
USPC ........... 370/255; 370/328; 370/352; 370/394; 370/469; 709/203; 709/228; 709/230; 709/250

(58) Field of Classification Search
USPC .................. 370/328, 352, 389, 394, 395.52, 370/419, 463, 469; 709/203, 227, 228, 230, 709/235, 236, 250
See application file for complete search history.

(56) References Cited

U.S. PATENT DOCUMENTS

| | | | | |
|---|---|---|---|---|
| 5,758,190 | A * | 5/1998 | Johnson et al. | 710/48 |
| 6,526,433 | B1 * | 2/2003 | Chang et al. | 709/201 |
| 6,674,713 | B1 * | 1/2004 | Berg et al. | 370/217 |
| 6,711,621 | B1 * | 3/2004 | Mitra et al. | 709/230 |
| 6,829,662 | B2 * | 12/2004 | King-Smith et al. | 710/56 |
| 7,219,346 | B2 * | 5/2007 | Patiejunas | 718/102 |
| 7,400,878 | B2 * | 7/2008 | Hassan et al. | 455/410 |
| 7,493,398 | B2 * | 2/2009 | Bush | 709/227 |
| 7,564,854 | B2 * | 7/2009 | Pong | 370/395.52 |
| 7,593,338 | B2 | 9/2009 | Moon et al. | |
| 7,613,976 | B2 | 11/2009 | Ludwig et al. | |
| 7,730,202 | B1 * | 6/2010 | Biederman et al. | 709/235 |
| 7,881,738 | B2 * | 2/2011 | Santhanam | 455/519 |
| 7,911,994 | B2 * | 3/2011 | Clarke et al. | 370/328 |
| 8,000,313 | B1 * | 8/2011 | Shah et al. | 370/350 |

(Continued)

OTHER PUBLICATIONS

"Solaris Tunable Parameters Reference Manual", *Chapter 4*—p. 31 Part No. 819-2724-09, Jan. 2008 http://dlc.sun.com/osol/docs/content/SOLTUNEPARAMREF/chapter4-31.html (obtained from the internet on Jul. 1, 2010) Jan. 2008 , 21 pages.

(Continued)

*Primary Examiner* — Andrew Lai
*Assistant Examiner* — Andrew C Lee
(74) *Attorney, Agent, or Firm* — DeLizio Gilliam, PLLC (57) ABSTRACT

A network communication device can implement configurable network socket retransmission timeout parameters on a per socket basis. In one embodiment, it is determined, at a first network device, whether to define a network socket with a custom or a default retransmission timeout value to transmit data to a second network device. In response to determining to define the network socket with the custom retransmission timeout value, the network socket is defined with the custom retransmission timeout value, the data is transmitted to the second network device, and it is determined whether response data is received from the second network device prior to expiration of a time period associated with the custom retransmission timeout value. In response to determining that the response data is not received from the second network device prior to the expiration of the corresponding time period, the data is retransmitted to the second network device.

18 Claims, 5 Drawing Sheets

U.S. PATENT DOCUMENTS

| | | | |
|---|---|---|---|
| 8,204,828 B1* | 6/2012 | Kuite et al. | 705/41 |
| 8,230,078 B2* | 7/2012 | Herr et al. | 709/227 |
| 2003/0033520 A1* | 2/2003 | Peiffer et al. | 713/153 |
| 2004/0062267 A1* | 4/2004 | Minami et al. | 370/463 |
| 2004/0156366 A1* | 8/2004 | Walls et al. | 370/394 |
| 2005/0027858 A1* | 2/2005 | Sloth et al. | 709/224 |
| 2005/0108710 A1* | 5/2005 | Patiejunas | 718/100 |
| 2005/0160163 A1* | 7/2005 | Nguyen et al. | 709/223 |
| 2006/0069775 A1* | 3/2006 | Artobello et al. | 709/225 |
| 2006/0168262 A1* | 7/2006 | Frazer | 709/230 |
| 2007/0133414 A1 | 6/2007 | Krishna et al. | |
| 2008/0056290 A1* | 3/2008 | Hegde et al. | 370/412 |
| 2008/0148378 A1* | 6/2008 | Wing et al. | 726/11 |
| 2008/0267141 A1* | 10/2008 | Ren et al. | 370/337 |
| 2008/0282162 A1* | 11/2008 | Lincke et al. | 715/710 |
| 2008/0291911 A1 | 11/2008 | Lee et al. | |
| 2009/0241001 A1 | 9/2009 | Park et al. | |
| 2010/0019030 A1* | 1/2010 | Monk | 235/380 |
| 2010/0057932 A1* | 3/2010 | Pope et al. | 709/236 |
| 2010/0306392 A1* | 12/2010 | Fell et al. | 709/228 |

OTHER PUBLICATIONS

Chen, Yanpei et al., "Understanding TCP Incast Throughput Collapse in Datacenter Networks", *in Datacenter Networks is from WREN'09*, Aug. 21, 2009, Barcelona, Spain Aug. 21, 2009, 10 pages.

Vasudevan, Vijay et al., "Safe and Effective Fine-grained TCP Retransmissions for Datacenter Communication", *is from SIGCOMM'09*, Aug. 17-21, 2009, Barcelona, Spain Aug. 17-21, 2009, 12 pages.

* cited by examiner

CONFIGURABLE NETWORK SOCKET RETRANSMISSION TIMEOUT PARAMETERS

BACKGROUND

Embodiments of the inventive subject matter generally relate to the field of computer systems, and, more particularly, to implementing configurable network socket retransmission timeout parameters in computer systems.

Transport layer protocols, such as the transport connection protocol (TCP), can implement a retransmission timeout process that may cause a source network device that transmits data to a destination network device to retransmit the data to the destination network device. The source network device can retransmit the data to the destination network device if a time period associated with a retransmission timeout parameter expires prior to receiving response data from the destination network device. For example, if the source network device is a server system transmitting data to a client device (the destination network device), the server system retransmits the data to the client device if the retransmission timeout period expires prior to receiving response data (e.g., an acknowledgement message) from the client device. In another example, if the source network device is a client device transmitting data (e.g., a request message) to a server system (the destination network device), the client device retransmits the request message to the server system if the retransmission timeout period expires prior to receiving response data (e.g., an acknowledgement message or the requested data) from the server system.

SUMMARY

Various embodiments for implementing configurable network socket retransmission timeout parameters in a network communication device on a per socket basis are described herein. In one embodiment, it is determined, at a first network device, whether to define a network socket, associated with a network connection with a second network device, with a custom retransmission timeout value to transmit data to the second network device. In response to determining to define the network socket with the custom retransmission timeout value, the network socket is defined with the custom retransmission timeout value, the data is transmitted to the second network device via the network connection associated with the network socket, and it is determined whether response data is received from the second network device prior to expiration of a time period associated with the custom retransmission timeout value. In response to determining that the response data is not received from the second network device prior to the expiration of the time period associated with the custom retransmission timeout value, the data is retransmitted to the second network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. For instance, although examples refer to implementing configurable network socket retransmission timeout parameters in systems that implement transmission control protocol (TCP), in other embodiments, operations described herein for implementing configurable network socket retransmission timeout parameters can be extended to systems that implement other communication standards and protocols. In other instances, well-known instruction instances, protocols, structures and techniques have not been shown in detail in order not to obfuscate the description.

A retransmission timeout process may cause a first network device that transmits data to a second network device to retransmit the data to the second network device after waiting a predefined retransmission timeout period. Typically, the retransmission timeout period is set to a default or global retransmission timeout value for all network sockets that are initiated by all applications at the first network device, regardless of the network capabilities and the type of data transmission. For TCP, the default or global retransmission timeout value is typically set at 200 msec. In these systems, the first network device can retransmit the data to the second network device if the first network device does not receive response data from the second network device within 200 msec after the original transmission. In some cases, the first network device can be configured to go through various retransmission cycles before the first network device detects an error condition. In one example, the first network device can be configured to go through 12 retransmission cycles before it determines that an error condition exists in the network and/or in the second network device. After detecting the error condition, the first network device may halt or delay further communications with the second network device. Some communication systems (e.g., systems that implement high bandwidth and/or low delay data communications) may be unnecessarily delayed, congested, performance reduced, or otherwise limited by using the default retransmission timeout period.

In some embodiments, network communication devices can implement configurable retransmission timeout values on a per socket basis for data transactions with other network devices, as will be further described below with reference to FIGS. 1-5. The retransmission timeout value associated with each network socket can be customized depending on one or more predefined criteria (e.g., the type of data communication, network capabilities, etc.) and other retransmission configuration information (e.g., provided by a system administrator or an application) to reduce the duration of the retransmission timeout cycle(s), and therefore reduce unneeded delays and congestions in some of the network data transactions.

Figure 1:
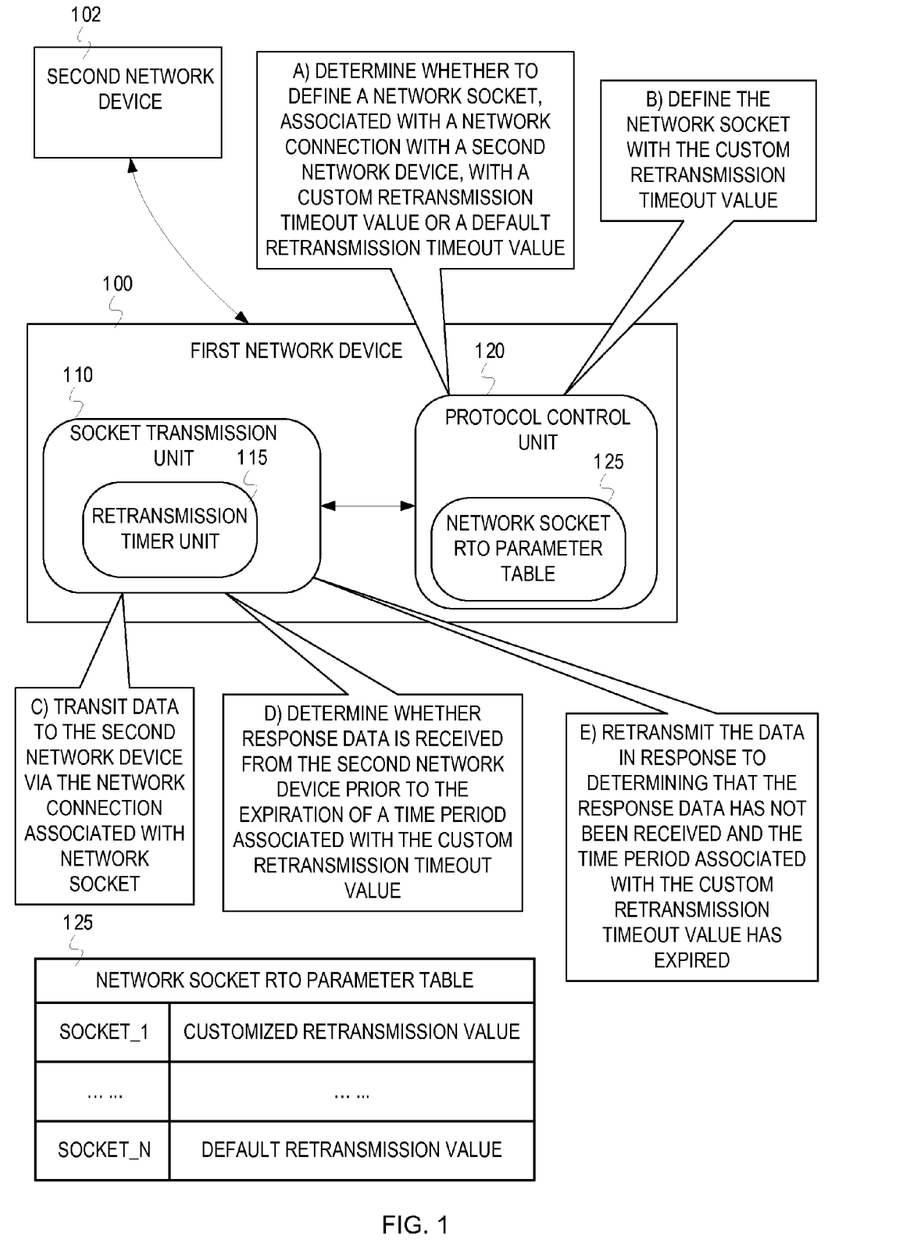
FIG. 1 is an example conceptual diagram illustrating example operations for implementing configurable network socket retransmission timeout parameters in a network communication device on a per socket basis.

FIG. 1 is an example conceptual diagram illustrating example operations for implementing configurable network socket retransmission timeout parameters in a network communication device on a per socket basis. As shown in FIG. 1, the first network device 100 can comprise a socket transmission unit 110 and a protocol control unit 120. The socket transmission unit 110 and the protocol control unit 120 can implement configurable network socket retransmission timeout parameters, as will be further described below with reference to Stages A-E. In one implementation, the first network device 100 can be a client or server system on a communication network that implements a transport layer connection protocol (e.g., TCP) to establish connections with other network devices (e.g., the second network device 102).

At stage A, the protocol control unit 120 of the first network device 100 determines to define a network socket, associated with a network connection with the second network device 102, with either a custom retransmission timeout value or a default (or global) retransmission timeout value. In some implementations, a network socket can be a communications connection point (or endpoint) of a bidirectional inter-process communication flow across a communications network (e.g., between a client and a server). The protocol control unit 120 can create and define the network socket associated with the network connection with the second network device 102. In some embodiments, the protocol control unit 120 can allow a retransmission timeout parameter for each network socket to be customized on a per network socket basis. When a retransmission timeout parameter is not customized for a particular network socket, the protocol control unit 120 can define the network socket with the default retransmission timeout value. In one implementation, the protocol control unit 120 can determine whether to define the network socket with either the default retransmission timeout value or a customized retransmission timeout value based on the type of data communication associated with the network socket. For example, the user of the first network device 100 (e.g., the system administrator) can configure the protocol control unit 120 to utilize a first custom retransmission timeout value for a first type of data communication, and a second custom retransmission timeout value for a second type of data transmission (and therefore override the default retransmission timeout value). If the data communication is neither the first or second type of data communication, the protocol control unit 120 can utilize the default retransmission timeout value. In one example, the first network device 100 can be one or more server systems in a data center that utilize TCP for data communications. The system administrator of the first network device 100 can configure the protocol control unit 120 to automatically define network sockets associated with data center workloads with a custom retransmission timeout value (e.g., 1 msec), and automatically define network sockets associated with non-data center workloads with the default retransmission timeout value (e.g., 200 msecs). In some implementations, instead of the system administrator configuring the protocol control unit 120, the application being run by the first network device 100 to initiate, manage and/or perform the data transfers can configure criteria for determining whether to dynamically customize the retransmission timeout parameter associated with each network socket based on the type of data communication (e.g., high/low priority, high/low delay, critical/non-critical, bandwidth, data type, data size, protocol, etc.). In some implementations, the retransmission timeout parameter can be customized based on other criteria besides the type of data communication, such as network configurations and network capabilities. In some implementations, the default (or global) retransmission timeout value can be predefined based on the protocol that is being implemented, or can be predefined based on input from the administrative user.

At stage B, the protocol control unit 120 defines the network socket with a custom retransmission timeout value. In one implementation, the protocol control unit 120 defines the network socket with a custom retransmission timeout value determined based on criteria configured by the administrative user. For example, the protocol control unit 120 defines the network socket with a custom retransmission timeout value (e.g., 1 msec) configured by the administrative user in response to determining to use a custom retransmission timeout value. In another example, the protocol control unit 120 defines the network socket with one of a plurality of custom retransmission timeout values configured by the administrative user based on the type of data communication (and/or other predefined criteria). In another implementation, the protocol control unit 120 defines the network socket with a custom retransmission timeout value determined based on criteria configured by an application running on the first network device 100 that initiates, manages and/or performs the data transfer. For example, the application that is managing and/or performing the data transfer can configure the protocol control unit 120 to utilize a custom retransmission timeout value depending on the type of data communication (or other predefined criteria). For high bandwidth and/or low delay data communications, the custom retransmission timeout value(s) can be substantially less than the default retransmission timeout value to reduce retransmission related delays. In one example, the custom retransmission timeout value can be set to 1 msec compared to the default retransmission timeout value of 200 msec. In response to detecting the type of data communication (and/or other predefined criteria) that is associated with a custom retransmission timeout value, the protocol control unit 120 defines the network socket with the custom retransmission timeout value. In some embodiments, the protocol control unit 120 defines the retransmission timeout parameter associated with the network socket with the custom retransmission timeout value by storing an indication of each network socket of the first network device 100 and the corresponding retransmission timeout value (e.g., the custom value) in a data structure associated with the network sockets. In the example of FIG. 1, the protocol control unit 120 can populate a network socket RTO parameter table 125 to define each network socket of the first network device 100 with either the custom or default retransmission timeout value (e.g. SOCKET_1-SOCKET_N). As shown in FIG. 1, in one example, each entry of the network socket RTO parameter table 125 can define a network socket with either the custom or default retransmission timeout value. The protocol control unit 120 can also define other network sockets with either a custom or a default retransmission timeout value on a per socket basis based on the predefined criteria associated with each network socket.

At stage C, the socket transmission unit 110 transmits data to the second network device via the network connection associated with the network socket. In response to transmitting the data to the second network device 102, the socket transmission unit 110 initiates a retransmission timeout timer within a retransmission timer unit 115. The retransmission timer unit 115 is configured to implement a plurality of retransmission timeout timers for the network sockets that are initiated by the first network device 100. In some embodiments, the retransmission timeout timer is programmed with the custom retransmission timeout value associated with the network socket, and then the retransmission timeout timer is initiated when the data is transmitted. In one example, the socket transmission unit 110 can determine the custom (or default) retransmission timeout value associated with the network socket from the protocol control unit 120 (e.g., the network socket RTO parameter table 125). It is noted that when the protocol control unit 120 is configured with the default retransmission timeout value for the network socket, the socket transmission unit 110 can program the retransmission timeout timer with the default retransmission timeout value. It is noted, however, that in other implementations the retransmission timeout timer mechanism can be implemented by other techniques to monitor multiple retransmission timeout periods associated with multiple network sockets, as will be further described below.

At stage D, the socket transmission unit 110 determines whether response data is received from the second network device prior to the expiration of a time period associated with the custom retransmission timeout value. The socket transmission unit 110 determines whether response data was received prior to the retransmission timeout timer expiring to determine whether to retransmit the data. For example, if the first network device 100 is a server system that transmitted data to the second network device 102 (e.g., a client device), the response data may be an acknowledgement message that the client device sends to the server system after receiving the data. In another example, if the first network device 100 is a client device that transmits data (e.g., a request message requesting information) to the second network device 102 (e.g., a server system), the response data may be an acknowledgement message from the server system confirming reception of the request message, or the response data may be the data the client device requested. It is noted, however, in other implementations the transmitted data and the response data may be other types of transactions between two network entities (e.g., a client device and a server system).

At stage E, the socket transmission unit 110 retransmits the data in response to determining that response data has not been received and the time period associated with the custom retransmission timeout value has expired. For example, the socket transmission unit 110 detects that the retransmission timeout timer (of the retransmission timer unit 115) that was programmed with the custom retransmission timeout value has counted down to zero (or has counted up to the custom retransmission timeout value), and that the response data has not been received from the second network device 102. In response to determining that the time period associated with the custom retransmission timeout value has expired, the socket transmission unit 110 automatically retransmits the data to the second network device 102.

As described above, in one implementation, the server systems in a data center can implement configurable retransmission timeout values to customize the network sockets that are associated with high bandwidth and low delay data center communications between the server system and client devices, and use the default retransmission timeout value for network sockets associated with low bandwidth and higher delay non-data center communications (e.g., non-critical data transfers between servers in the data center). In another implementation, when a client device is trying to access a server system to request data, if a server system is taken offline, the client device can repeatedly try to retransmit the request until it succeeds or until the underlying retransmission cycle limit is reached (which informs the client device of an error condition). Therefore, when a server system is taken offline, the corresponding operations associated with the client device can be stalled for a relatively long time trying to retransmit the request to the server system before detecting an error condition (which can impact system performance). If the client device implements configurable retransmission timeout values for network sockets, the client device can customize the amount of time associated with each retransmission cycle, and therefore reduce the amount of time (compared to the default value) the client device waits to detect an error condition at the server system or the network.

The protocol control unit 120 can be implemented in software and/or firmware associated with the transport layer of the first network device 100. For example, in TCP, the protocol control unit 120 can be implemented in the TCP layer. The protocol control unit 120 may also be implemented in software and/or firmware that is distributed across both the transport layer and the socket layer of the first network device 100. The socket transmission unit 110 can be implemented in software and/or firmware in the socket layer. The socket transmission unit 110 may also be implemented in software and/or firmware that is distributed across both the socket layer and the transport layer of the first network device 100. It is noted, however, that in other embodiments the protocol control unit 120 and the socket transmission unit 110 may comprise functionality that is distributed across other modules and components associated with the operating system of the first network device 100.

Figure 2:
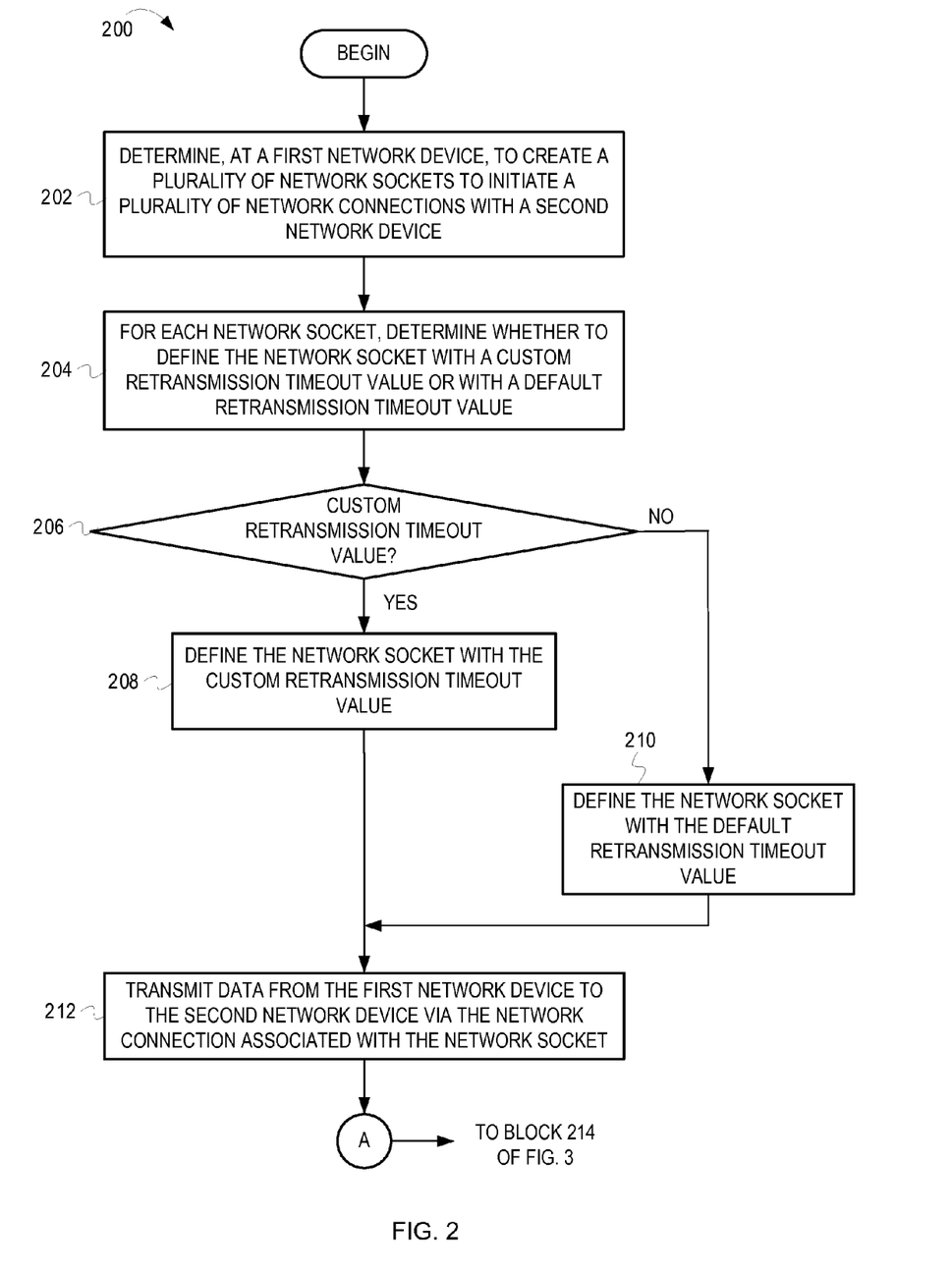
FIG. 2 is a flow diagram illustrating example operations for implementing configurable network socket retransmission timeout parameters in a network communication device on a per socket basis.

FIG. 2 is a flow diagram ("flow") 200 illustrating example operations for implementing configurable network socket retransmission timeout parameters in a network communication device on a per socket basis. The flow begins at block 202.

It is determined, at a first network device, to create a plurality of network sockets to initiate a plurality of network connections with a second network device (202). For example, the protocol control unit 120 of the first network device 100 creates a plurality of network sockets to initiate a plurality of network connections with the second network device 102. As described above, in some implementations, a network socket can be a communications connection point (or endpoint) of a bidirectional inter-process communication flow across a communications network (e.g., between a client and a server). For example, the protocol control unit 120 may create each network socket to initiate a network connection with the second network device 102 in response to detecting that data is scheduled to be transmitted to the second network device 102, or in response to receiving a request (or other trigger) to create a network socket (e.g., from an application running in the first network device 100). The protocol control unit 120 can create and define the plurality of network sockets associated with the plurality of network connections with the second network device 102 (or with a plurality of other network devices). The flow continues at block 204.

For each network socket of the first network device 100, it is determined whether to define the network socket with a custom retransmission timeout value or a default retransmission timeout value (204). In some embodiments, the protocol control unit 120 can determine whether to customize a retransmission timeout parameter for each network socket on a per network socket basis. When the retransmission timeout parameter for a network socket is not customized with a custom retransmission timeout value, the protocol control unit 120 defines the network socket with the default retransmission timeout value. As described above in FIG. 1, in some implementations, the protocol control unit 120 determines whether to define the network socket with either the default or custom retransmission timeout value based on configuration information provided by a system administrator or by an application that is managing and/or performing the data transfer at the first network device 100 (or from another entity). The configuration information may include predefined criteria for determining whether to customize the retransmission timeout value (e.g., based on the type of data communication, the network configuration, and/or the network capabilities), and also the custom retransmission timeout value(s) associated with the predefined criteria. The flow continues at block 206.

In response to determining to define the network socket with a custom retransmission timeout value (206), the protocol control unit 120 defines the network socket with the custom retransmission timeout value (208). As described above in FIG. 1, in some embodiments, the protocol control unit 120 defines the retransmission timeout parameter associated with the network socket with the custom retransmission timeout value by storing an indication of each network socket of the first network device 100 and the corresponding retransmission timeout value (e.g., the custom value) in a data structure associated with the network sockets. For example, the protocol control unit 120 can populate or configure the network socket RTO parameter table 125 (shown in FIG. 1) to define each network socket (e.g. SOCKET_1-SOCKET_N) of the first network device 100 with either the custom or default retransmission timeout value. In some examples, for high bandwidth and/or low delay data communications, the custom retransmission timeout value can be substantially less than the default retransmission timeout value. For example, the custom retransmission timeout value can be set to 1 msec compared to the default retransmission timeout value of 200 msec. In some cases, the protocol control unit 120 can be configured with two or more retransmission timeout values and the protocol control unit 120 can determine which custom value to use based on the predefined criteria. The flow continues at block 212.

In response to determining not to define the network socket with a custom retransmission timeout value (206), the protocol control unit 120 defines the network socket with the default retransmission timeout value (210). The flow continues at block 212.

The data is transmitted to the second network device via the network connection associated with the network socket (212). For example, the socket transmission unit 110 transmits the data to the second network device. The flow continues at block 214 of FIG. 3.

Figure 3:
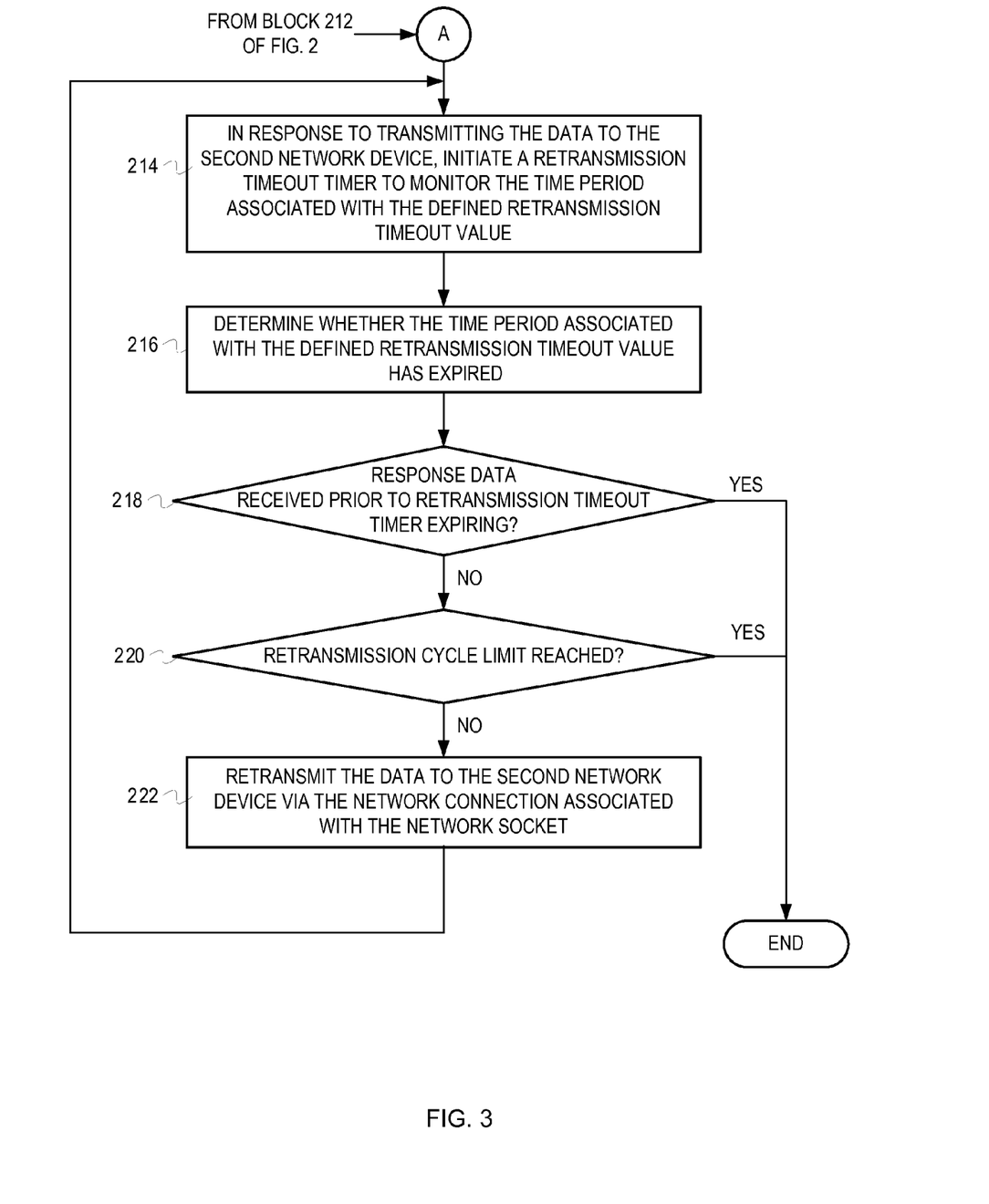
FIG. 3 is a flow diagram illustrating additional example operations for implementing configurable network socket retransmission timeout parameters in a network communication device on a per socket basis.

FIG. 3 is a flow diagram illustrating additional example operations for implementing configurable network socket retransmission timeout parameters in a network communication device on a per socket basis. The flow diagram of FIG. 3 is a continuation of the flow diagram shown in FIG. 2, and begins at block 214.

In response to transmitting the data to the second network device 102, initiating a retransmission timeout timer within the retransmission timer unit 115 to monitor the time period associated with the defined retransmission timeout value (214). For example, the socket transmission unit 110 initiates the retransmission timeout timer that is programmed according to the defined retransmission timeout value (either custom or default). The socket transmission unit 110 can determine the custom or default retransmission timeout value associated with the network socket from the protocol control unit 120 (e.g., the network socket RTO parameter table 125). In another example, the socket transmission unit 110 initiates the retransmission timeout timer and either the retransmission timeout unit 115 or the socket transmission unit 110 monitors the timer to determine when the time period associated with the defined retransmission timeout value has expired. In yet another embodiment, the socket transmission unit 110 determines a starting timestamp associated with a common retransmission timeout timer when the data is transmitted, and then monitors the timer to determine when the time period associated with the defined retransmission timeout value has expired (based on an ending timestamp value). It is noted, however, that in other implementations the retransmission timeout timer mechanism can be implemented by other techniques to monitor multiple retransmission timeout periods associated with multiple network sockets, as will be further described below. The flow continues at block 216.

It is determined whether the time period associated with the defined retransmission timeout value has expired (216). For example, the socket transmission unit 110 determines whether the retransmission timeout timer programmed with the defined retransmission timeout value (either default or custom) has expired. In another example, the socket transmission unit 110 determines that the time period associated with the defined retransmission timeout value has expired based on an indication (e.g., a message, a signal, bits set in a register, etc.) obtained from the retransmission timeout timer or the retransmission timeout unit 115. It is noted, however, that in other implementations the socket transmission unit 110 can determine when the time period has expired by other methods. The flow continues at block 218.

It is determined whether response data is received from the second network device prior to the expiration of the time period associated with the defined retransmission timeout value (218). For example, the socket transmission unit 110 determines whether response data was received prior to the retransmission timeout timer expiring to determine whether to retransmit the data. As described above in FIG. 1, the response data may be an acknowledgement message from the second network device, or the requested data, or other types of response data depending on the type of data communications between the first and second network devices (e.g., client and server systems). If the response data is received prior to the expiration of the time period associated with the defined retransmission timeout value, the data communication was successful between the devices, and the flow ends. If the response data is not received prior to the expiration of the time period associated with the defined retransmission timeout value, the data communication between the devices was not successful, and the flow continues at block 220. For example, if the first network device 100 is a client device that is requesting data from a server system (the second network device 102), the server system may not respond if the server system has been taken offline (e.g., for maintenance, upgrades, etc.). In another example, if the first network device 100 is a server system that is providing requested data to a client device (the second network device 102), the client device may not respond (e.g., with an acknowledge message) if the client device is taken offline or the network has experienced problems that result in the client device not receiving the requested data. The flow continues at block 220.

It is determined whether a retransmission cycle limit has been reached (220). For example, the socket transmission unit 110 determines whether the retransmission cycle limit has been reached for the data communication. In some implementations, the first network device 100 may attempt a maximum number of retransmission cycles (defined by the retransmission cycle limit) before the first network device 100 determines there is an error condition in the network or at the second network device 102, and either cancels or delays the data transmission. Furthermore, if an error condition is detected, the first network device 100 can provide an indication of the error condition to the system administrator and/or the application that is performing/managing the data transaction. In some examples, for high bandwidth and/or low delay data communications, by customizing the retransmission timeout value to be substantially less than the default retransmission timeout value, the first network device 100 can run through the maximum number of retransmission cycles in a shorter period of time, and therefore detect the error condition much faster. If the retransmission cycle limit has been reached, the flow ends. If the retransmission cycle limit has not been reached, the flow continues at block 222.

The data is retransmitted to the second network device 102 via the network connection associated with the network socket, in response to determining that response data was not received prior to the expiration of the time period associated with the defined retransmission timeout value and in response to determining that the retransmission cycle limit has not been reached (222). For example, the socket transmission unit 110 detects that the retransmission timeout timer (of the retransmission timer unit 115) that was programmed with the defined retransmission timeout value has counted down to zero (or has counted up to the defined retransmission timeout value), and that the response data has not been received from the second network device 102. In response to determining that the time period associated with the defined retransmission timeout value has expired (and the retransmission cycle limit has not be reached), the socket transmission unit 110 retransmits the data to the second network device 102. After block 222, the flow continues at block 214, where a retransmission timeout timer is initiated and the process is repeated for each retransmission cycle until the response data is received or the retransmission cycle limit is reached.

In some embodiments, the first network device 100 can implement a retransmission timeout timer mechanism (e.g., within the retransmission timer unit 115) for monitoring the retransmission timeout periods associated with multiple network sockets that are created at the first network device 100 to perform multiple data transactions with one or more network devices (e.g., the second network device 102). The socket transmission unit 110 can first determine the lowest custom retransmission timeout value that can be supported by the first network device 100. For example, the lowest custom retransmission timeout value may be 2 msec. The socket transmission unit 110 can maintain a base (configurable) value for the duration of the lowest custom retransmission timeout value for a timer (the base timer). The socket transmission unit 110 can then determine the retransmission timeout values (both custom and default) of all the defined network sockets of the network device 100. All of the retransmission timeout values will be greater or equal to the lowest custom retransmission timeout value (e.g., 2 msec). The retransmission timeout values can be sorted in ascending order, and each value can be divided by the lowest custom retransmission value to determine the quotient value and the remainder value when compared to the lowest custom retransmission value. In other words, for every retransmission timeout value of each network socket (other than the lowest), there will be 2 values maintained—one will be the quotient value (which will be used as a counter for the base timer that is set to the lowest custom retransmission value), and the second will be the reminder value (which can be monitored by a separate timer). The quotient value and the remainder value are stored and associated with the corresponding network socket. The base timer that is set to the lowest custom retransmission value is then started. Whenever the base timer triggers, it will decrement the quotient values (counters) associated with each network socket. When a quotient value associated with a network socket becomes zero with a zero remainder, the retransmission timeout process is invoked. For example, the socket transmission unit 110 can determine that the time period associated with the defined retransmission timeout value associated with a network socket has expired when the quotient value and the remainder value are both zero. After determining the quotient value and the remainder value are both zero, the socket transmission unit 110 performs the operations described above with reference to FIGS. 1-3 for determining whether response data was received and whether to retransmit the data. If the quotient value is zero and the remainder is non-zero, a separate remainder timer set at the remainder value is initiated. The socket transmission unit 110 determines that the retransmission timeout period expires when the remainder timer counts down to zero. In one implementation, the remainder timer will not be restarted after completion, and once it completes it sets the counter value (quotient) back to its original value.

In one example, the defined retransmission timeout values for 5 network sockets of the first network device 100 may be 2 msec for network socket A, 7 msec for network socket B, 11 msec for network socket C, 16 msec for network socket D, and 21 msec for network socket E. The base timer can be set with the lowest custom retransmission timeout value, which may be 2 msec in this example. Therefore, the base timer can be started every 2 msecs. In this example, for network socket B, the counter value is 3 with a remainder value of 1, which can be represented as 7(3,1). For network socket C, the counter value is 5 with a remainder value of 1, which can be represented as 11(5,1). For network socket D, the counter value is 8 with a remainder value of 0, which can be represented as 16(8,0). For network socket E, the counter value is 10 with a remainder value of 1, which can be represented as 21(10,1). Since the network socket A has a defined retransmission timeout value of 2 msec, the retransmission process is triggered each time the base timer counts down. After the base timer triggers the first time (and the counter values are decremented by one), the network socket counter/remainder values starting with network socket A are the following: 2, 7(2,1), 11 (4,1), 16 (7,0), 21 (9,1). After the base timer triggers the third time (and the counter values are decremented by three), the network socket counter/remainder values are now the following: 2, 7(0,1), 11 (2,1), 16 (5,0), 21 (7,1). At this point, the retransmission timer is triggered for network socket B (since the counter value is zero and the remainder value is 1). After the base timer triggers the eighth time (and the counter values are decremented by eight, including some counter values that have been re-started), the network socket counter/remainder values are now the following: 2, 7(1,1), 11 (3,1), 16 (0,0), 21 (2,1). At this point, the socket transmission unit 110 can determine that the time period associated with the defined retransmission timeout value for network socket D has expired. It is noted, however, that in other implementations the socket transmission unit 110 can implement the retransmission timer mechanism by other techniques that are different than the techniques described above (e.g., starting a separate timer for each network socket).

It should be understood that the depicted diagrams (FIGS. 1-3) are examples meant to aid in understanding embodiments and should not be used to limit embodiments or limit scope of the claims. Embodiments may perform additional operations, fewer operations, operations in a different order, operations in parallel, and some operations differently. For example, a custom retransmission timeout value can be obtained any time after the network socket is created to define (or redefine) the network socket. In other words, the network socket can be initially defined with the default retransmission timeout value and at a later time (e.g., after obtaining configuration information and criteria from an application or system administrator) can be redefined with a custom retransmission timeout value (or vice versa). In some implementations, when the protocol control unit 120 detects an updated retransmission timeout value, the socket transmission unit 110 can instantly begin to implement the updated retransmission timeout value to the data transaction. In other implementations, the socket transmission unit 110 can begin to implement the updated retransmission timeout value until the next data transaction. It is further noted that although some examples describe implementing configurable retransmission timeout values in systems that implement TCP, the configurable retransmission timeout values can be implemented in systems that implement other suitable connection protocols (e.g., user datagram protocol (UDP)).

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
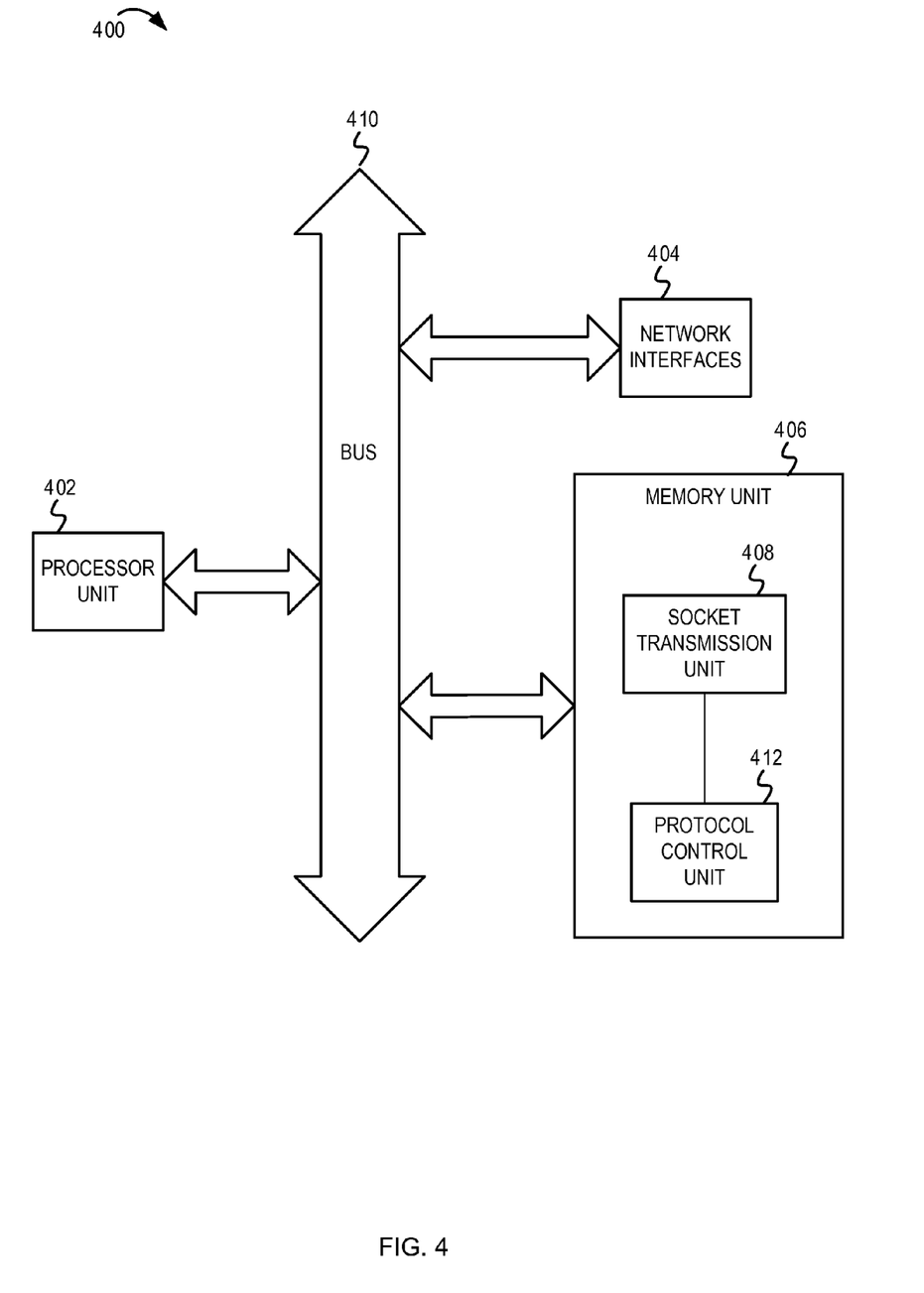
FIG. 4 is a block diagram of one embodiment of a computer system including a mechanism for implementing configurable network socket retransmission timeout parameters on a per socket basis.

FIG. 4 is a block diagram of one embodiment of a computer system 400 including a mechanism for implementing configurable network socket retransmission timeout parameters on a per socket basis. In some examples, the computer system may be a personal computer, a laptop, a server, or other machine that can communicate and exchange information in a client-server network. The computer system 400 includes a processor unit 402 (possibly including multiple processors, multiple cores, multiple nodes, and/or implementing multi-threading, etc.). The computer system 400 includes a memory unit 406. The memory unit 406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 400 also includes a bus 410 (e.g., PCI, ISA, PCI-Express, HyperTransport®, InfiniBand®, NuBus, AHB, AXI, etc.), and network interfaces 404 that include at least one wireless and/or wired network interface (e.g., a WLAN interface, a Bluetooth® interface, a WiMAX interface, a ZigBee® interface, a Wireless USB interface, USB interface, Ethernet interface, etc.). The memory unit 406 embodies functionality to implement embodiments described above. For example, the memory unit 406 may comprise a socket transmission unit 408 and a protocol control unit 412 that implements the functionality described above with reference to FIGS. 1-3.

Any one of these functionalities may be partially (or entirely) implemented in hardware and/or on the processor unit 402. For example, the functionality may be implemented with an application specific integrated circuit, in logic implemented in the processor unit 402, in a co-processor on a peripheral device or card, etc. Further, realizations may include fewer or additional components not illustrated in FIG. 4 (e.g., video cards, audio cards, additional network interfaces, peripheral devices, etc.). The processor unit 402, the memory unit 406, and the network interfaces 404 are coupled to the bus 410. Although illustrated as being coupled to the bus 410, the memory unit 406 may be coupled to the processor unit 402.

Figure 5:
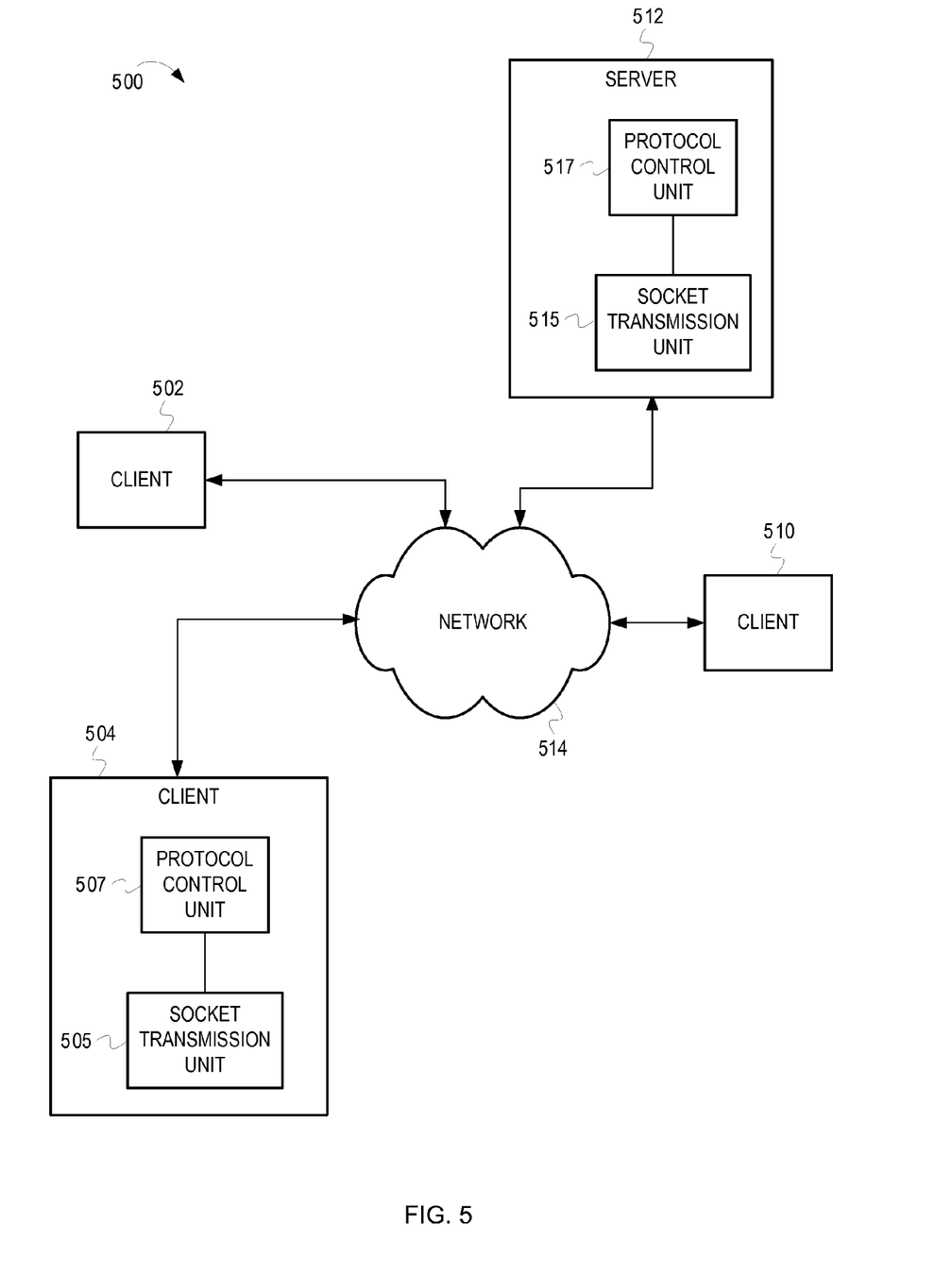
FIG. 5 is an example block diagram illustrating a system configured for implementing configurable network socket retransmission timeout parameters on a per socket basis.

FIG. 5 is an example block diagram illustrating a system 500 configured for implementing configurable network socket retransmission timeout parameters in network communication devices on a per socket basis. The system 500 comprises a server 512 and clients 502, 504, and 510. As shown, the server 512 comprises a socket transmission unit 515 and a protocol control unit 517, and the client 504 comprises a socket transmission unit 505 and a protocol control unit 507, which are configured to implement configurable network socket retransmission timeout parameters (on a per socket basis) at the server 512 and at the client 504, as described above with reference to FIGS. 1-4.

The server 512 communicates with the clients 502, 504, and 510 via a communication network 514. The communication network 514 can include any technology (e.g., Ethernet, IEEE 802.11n, SONET, etc.) suitable for communicating between the server 512 and the clients 502, 504, and 510. Moreover, the communication network 514 can be part of other networks, such as cellular telephone networks, public-switched telephone networks (PSTN), cable television networks, etc. Additionally, the server 512 and the clients 502, 504, and 510 can be any suitable devices capable of executing software in accordance with the embodiments described herein.

While the embodiments are described with reference to various implementations and exploitations, it will be understood that these embodiments are illustrative and that the scope of the inventive subject matter is not limited to them. In general, techniques for implementing configurable network socket retransmission timeout parameters on a per socket basis as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, at a first network device, whether to define each of a plurality of network sockets, associated with a plurality of network connections with a plurality of additional network devices including a second network device, with one of a plurality of custom retransmission timeout values or a default retransmission timeout value to transmit data to the plurality of additional network devices;
   in response to determining to define one or more of the plurality of network sockets with one of the plurality of custom retransmission timeout values,
      defining a subset of the plurality of network sockets of the first network device with one of the plurality of custom retransmission timeout values;
      defining a remainder of the plurality of network sockets of the first network device with the default retransmission timeout value;
      transmitting the data to the second network device via a network connection of the plurality of network connections, the network connection associated with a network socket of the plurality of network sockets;
      determining whether response data is received from the second network device prior to expiration of a time period associated with the custom retransmission timeout value; and
      in response to determining that the response data is not received from the second network device prior to the expiration of the time period associated with the custom retransmission timeout value, retransmitting the data to the second network device.

2. The method of claim 1, further comprising:
   in response to determining not to define a network socket of the plurality of network sockets with the custom retransmission timeout value,
      defining the network socket with the default retransmission timeout value;
      transmitting the data to the second network device via a network connection of the plurality of network connections, the network connection associated with the network socket;
      determining whether response data is received from the second network device prior to expiration of a time period associated with the default retransmission timeout value; and
      in response to determining that the response data is not received from the second network device prior to the expiration of the time period associated with the default retransmission timeout value, retransmitting the data to the second network device.

3. The method of claim 2, wherein, in response to said transmitting the data to the second network device, the method further comprises:
   initiating a retransmission timer based on the default retransmission timeout value;
   determining whether response data is received from the second network device prior to the expiration of the retransmission timer; and
   in response to determining that the response data is not received from the second network device prior to the expiration of the retransmission timer, retransmitting the data to the second network device.

4. The method of claim 1, wherein, in response to said determining to define a network socket of the plurality of network sockets with the custom retransmission timeout value and said transmitting the data to the second network device, the method further comprises:
- initiating a retransmission timer based on the custom retransmission timeout value;
- determining whether response data is received from the second network device prior to the expiration of the retransmission timer; and
- in response to determining that the response data is not received from the second network device prior to the expiration of the retransmission timer, retransmitting the data to the second network device.

5. The method of claim 1, wherein the time period associated with the custom retransmission timeout value is less than a time period associated with the default retransmission timeout value.

6. The method of claim 1, wherein, in response to said determining that the response data is not received from the second network device prior to the expiration of the time period associated with the custom retransmission timeout value, the method further comprises:
- determining whether a retransmission cycle limit has been reached;
- if the retransmission cycle limit has not been reached, retransmitting the data to the second network device; and
- if the retransmission cycle limit has been reached, delaying or halting additional retransmissions of the data to the second network device.

7. The method of claim 1, wherein said determining, at a first network device, whether to define each of the plurality of the network sockets, associated with the plurality of network connections with the plurality of network devices, with one of the custom retransmission timeout values to transmit data to the plurality of additional network devices comprises:
- determining whether to define a network socket of the plurality of network sockets with the custom retransmission timeout value based, at least in part, on retransmission criteria configured by a user of the first network device or retransmission criteria configured by an application of the first network device associated with a pending data communication with the second network device.

8. The method of claim 1, wherein said determining, at a first network device, whether to define each of the plurality of the network sockets, associated with the plurality of network connections with the plurality of network devices, with one of the custom retransmission timeout values to transmit data to the plurality of additional network devices comprises:
- determining whether to define a network socket of the plurality of network sockets with the custom retransmission timeout value based, at least in part, on characteristics of a pending data communication with the second network device.

9. A network communication device comprising:
a processor;
a network interface coupled with the processor;
a protocol control unit coupled with the processor and the network interface, the protocol control unit operable to,
- determine whether to define each of a plurality of network sockets, associated with a plurality of network connections with a plurality of additional network communication devices including a second network communication device, with one of a plurality of custom retransmission timeout values or the default retransmission timeout value to transmit data to the plurality of additional network communication devices;
- define a subset of the plurality of network sockets of the network communication device with one of the plurality of custom retransmission timeout values; and
- define a remainder of the plurality of network sockets of the network communication device with the default retransmission timeout value;

a socket transmission unit coupled with the processor and the network interface, the socket transmission unit operable to,
- transmit the data to the second network communication device via a network connection of the plurality of network connections, the network connection associated with a network socket of the plurality of network sockets;
- determine whether response data is received from the second network communication device prior to expiration of a time period associated with a defined retransmission timeout value associated with the network socket; and
- in response to determining that the response data is not received from the second network communication device prior to the expiration of the time period associated with the defined retransmission timeout value associated with the network socket, retransmit the data to the second network communication device.

10. The network communication device of claim 9, wherein, in response to the socket transmission unit transmitting the data to the second network communication device, the socket transmission unit is further operable to:
- initiate a retransmission timer based on the time period associated with the defined retransmission timeout value;
- determine whether response data is received from the second network communication device prior to the expiration of the retransmission timer; and
- in response to determining that the response data is not received from the second network communication device prior to the expiration of the retransmission timer, retransmit the data to the second network communication device.

11. The network communication device of claim 10, wherein the defined retransmission timeout value associated with the network socket is the custom retransmission timeout value or the default retransmission timeout value.

12. The network communication device of claim 11, wherein a time period associated with the custom retransmission timeout value is less than a time period associated with the default retransmission timeout value.

13. The network communication device of claim 9, wherein, in response to the socket transmission unit determining that the response data is not received from the second network communication device prior to the expiration of the time period associated the defined retransmission timeout value associated with the network socket, the socket transmission unit is further operable to:
- determine whether a retransmission cycle limit has been reached;
- if the retransmission cycle limit has not been reached, retransmit the data to the second network communication device; and
- if the retransmission cycle limit has been reached, delay or halt additional retransmissions of the data to the second network communication device.

14. The network communication device of claim 9, wherein the protocol control unit is further operable to:
- determine whether to define a network socket of the plurality of network sockets based, at least in part, on retransmission criteria configured by a user of the network communication device, or retransmission criteria configured by an application of a network communication device of the plurality of network devices associated with a corresponding data communication.

15. A computer program product for implementing configurable network socket retransmission timeout values, the computer program product comprising:
- a computer readable storage medium having computer readable program code embodied therewith, the computer readable program code configured to,
- determine whether to define each of a plurality of network sockets, associated with a plurality of network connections with a plurality of additional network communication devices including a second network communication device, with one of a plurality of custom retransmission timeout values or the default retransmission timeout value to transmit data to the plurality of additional network communication devices;
- in response to determining to define the network socket with the custom retransmission timeout value,
  - define a subset of the plurality of network sockets of the network communication device with one of the plurality of custom retransmission timeout values; and
  - define a remainder of the plurality of network sockets of the network communication device with the default retransmission timeout value;
- transmit the data to the second network device via a network connection of the plurality of network connections, the network connection associated with a network socket of the plurality of network sockets;
- determine whether response data is received from the second network device prior to expiration of a time period associated with the custom retransmission timeout value; and
- in response to determining that the response data is not received from the second network device prior to the expiration of the time period associated with the custom retransmission timeout value, retransmit the data to the second network device.

16. The computer program product of claim 15, wherein the computer readable program code is further configured to:
- in response to determining not to define the network socket with the custom retransmission timeout value,
  - define the network socket with a default retransmission timeout value;
  - transmit the data to the second network device via the network connection associated with the network socket;
  - determine whether response data is received from the second network device prior to expiration of a time period associated with the default retransmission timeout value; and
  - in response to determining that the response data is not received from the second network device prior to the expiration of the time period associated with the default retransmission timeout value, retransmit the data to the second network device.

17. The computer program product of claim 16, wherein the time period associated with the custom retransmission timeout value is less than the time period associated with the default retransmission timeout value.

18. The computer program product of claim 15, wherein, in response to said determining that the response data is not received from the second network device prior to the expiration of the time period associated with the custom retransmission timeout value, the computer readable program code is further configured to:
- determine whether a retransmission cycle limit has been reached;
- if the retransmission cycle limit has not been reached, retransmit the data to the second network device; and
- if the retransmission cycle limit has been reached, delay or halt additional retransmissions of the data to the second network device.

* * * * *